United States Patent
Fischer et al.

(10) Patent No.: US 12,315,911 B2
(45) Date of Patent: May 27, 2025

(54) LITHIUM-SULFUR BATTERY WITH IMPROVED PERFORMANCES

(71) Applicants: SAFT, Levallois-perret (FR); KEMIJSKI INSTITUT, Ljubljana (SI)

(72) Inventors: Florent Fischer, Bruges (FR); Thierry Hezeque, Aubie Espessas (FR); Laura Maria Para, Cordoba Capital (AR); Cecilia Andrea Calderon, Córdoba (AR); Robert Dominko, Dol pri Ljubljani (SI)

(73) Assignees: SAFT, Levallois-Perret (FR); KEMIJSKI INSTITUT, Ljubljana (SI)

( * ) Notice: Subject to any disclaimer, the term of this patent is extended or adjusted under 35 U.S.C. 154(b) by 631 days.

(21) Appl. No.: 17/628,053

(22) PCT Filed: Aug. 22, 2019

(86) PCT No.: PCT/IB2019/001308
§ 371 (c)(1),
(2) Date: Jan. 18, 2022

(87) PCT Pub. No.: WO2021/033008
PCT Pub. Date: Feb. 25, 2021

(65) Prior Publication Data
US 2022/0278309 A1    Sep. 1, 2022

(51) Int. Cl.
| | |
|---|---|
| *H01M 4/136* | (2010.01) |
| *H01M 4/02* | (2006.01) |
| *H01M 4/134* | (2010.01) |
| *H01M 4/38* | (2006.01) |
| *H01M 4/58* | (2010.01) |
| *H01M 4/62* | (2006.01) |
| *H01M 10/052* | (2010.01) |
| *H01M 10/0569* | (2010.01) |

(52) U.S. Cl.
CPC .......... *H01M 4/136* (2013.01); *H01M 4/134* (2013.01); *H01M 4/382* (2013.01); *H01M 4/5815* (2013.01); *H01M 4/625* (2013.01); *H01M 10/052* (2013.01); *H01M 10/0569* (2013.01); *H01M 2004/021* (2013.01); *H01M 2300/0034* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 2011/0050178 A1* | 3/2011 | Kim ..................... | H01M 4/131 429/207 |
| 2012/0214043 A1* | 8/2012 | Olschimke ............ | H01M 10/05 558/260 |
| 2019/0067730 A1 | 2/2019 | Archer et al. | |
| 2021/0151802 A1* | 5/2021 | Fischer ................. | H01M 4/625 |

OTHER PUBLICATIONS

Sohn, H., Gordin, M.L., Xu, T., Chen, S., Lv, D., Song, J., Manivannan, A., Wang, D.—Porous Spherical carbon/Sulfur Nanocomposites by Aerosol-Assisted Synthesis: The Effect of Pore Structure and Morphology ion Their Electrochemical Performance as Lithium/Sulfur Battery Cathodes, ACS Appl. Mater., 2014 (Year: 2014).*
Takuya Takahashi, et al., "A sulfur-microporous carbon composite positive electrode for lithium/sulfur and silicon/sulfur rechargeable batteries", Progress in Natural Science Materials International, Dec. 25, 2015, pp. 612-621, vol. 25.
International Search Report for PCT/IB2019/001308 dated Mar. 31, 2020 [PCT/ISA/210].
Written Opinion for PCT/IB2019/001308 dated Mar. 31, 2020 [PCT/ISA/237].

* cited by examiner

*Primary Examiner* — Anca Eoff
(74) *Attorney, Agent, or Firm* — Sughrue Mion, PLLC

(57) ABSTRACT

An electrochemical cell of the lithium/sulfur type comprising:
a) a cathode comprising:
  i) microporous carbon in the form of particles, the particle size distribution being characterized by a median volume diameter $Dv_{50}$ of the particles which is greater than or equal to 1 µm and less than or equal to 5 µm;
  ii) sulfur having an oxidation degree in the range of 0 to −2 in the pores of the microporous carbon;
b) an electrolyte comprising a solvent, said solvent comprising at least one fluorinated carbonate;
c) an anode composed of lithium metal or of a lithium metal alloy.
The electrochemical cell exhibits an improved specific gravimetry and an improved life cycle.

15 Claims, 2 Drawing Sheets

LITHIUM-SULFUR BATTERY WITH IMPROVED PERFORMANCES

CROSS REFERENCE TO RELATED APPLICATIONS

This application is a National Stage of International Application No. PCT/IB2019/001308 filed Aug. 22, 2019.

TECHNICAL FIELD

The invention pertains to the technical field of lithium-sulfur (Li—S) electrochemical cells.

BACKGROUND OF THE INVENTION

Electrochemical secondary cells of the lithium-sulfur type (Li—S) are known in the art. The cathode is generally a composite material which comprises elemental solid sulfur as the electrochemically active material, and one or several non-electrochemically active materials. One may cite as non-electrochemically active materials electronic conductive materials such as carbon. Sulfur is indeed an electronic insulating material and the electronic conductive materials provide electronic conductivity between the particles of sulfur. One may also cite as non-electrochemically active materials one or more polymeric binder(s) the function of which is to reinforce cohesion between the particles of the various cathode materials. The anode is generally made of lithium metal or made of a lithium alloy. A separator prevents electrical contact between the cathode and the anode but allows ionic transport between the cathode and the anode. Unlike in lithium-ion cells, the electrolyte of lithium-sulfur cells typically comprises an ether-based solvent, such as 1,3-dioxolane, dimethoxyethane, or tetrahydrofuran.

By virtue of the low atomic weight of lithium and moderate weight of sulfur, Li—S electrochemical cells are relatively light, which are very promising in succeeding lithium-ion cells because of their higher energy density and the low cost of sulfur.

During the assembly step of a Li—S cell, the cathode active material is in the form of elemental solid sulfur and the anode is in the form of lithium metal (or lithium alloy). Hence, it is in the charged state at the end of the assembly step. During discharge of the cell, elemental solid sulfur at the cathode reduces into lithium sulfide $Li_2S$. Lithium metal (or the lithium alloy) oxidizes at the anode. The following reactions take place:

Cathode: $S_8 + 16\ e^- \longrightarrow 8\ S^{2-}$

Anode: $Li \longrightarrow Li^+ + e^-$

The global discharge reaction is: $16\ Li + S_8 \longrightarrow 8\ Li_2S$

Cyclic molecules of sulfur (in the form of octasulfur $S_8$) are reduced during the discharge of the cell and form linear chains of lithium polysulfides, of formula $Li_2S_n$, n generally ranging from 2 to 8. The first compounds formed during the discharge of the cell are long-chain lithium polysulfides, such as $Li_2S_8$ or $Li_2S_6$. Long-chain lithium polysulfides are well dissolved by ether-based solvents. These long chain lithium polysulfides may travel through the electrolyte and reach the lithium anode where they are reduced into short-chain polysulfides during charging of the cell. The short-chain polysulfides diffuse back to the cathode where they are again reoxidized into long-chain polysulfides, and so on. This "shuttle" mechanism causes low coulombic efficiency, low utilization of the sulfur cathode and degradation of the cell cycle life.

The use of microporous carbon in the cathode of Li—S cells has been found to greatly reduce the amount of polysulfides in the electrolyte during the charge-discharge process, thanks to a specific mechanism through a "quasi solid-state reaction". As a result, the "shuttle" mechanism is substantially reduced. However, microporous carbon has some limitations, especially in terms of the reversible capacity.

The use of graphene layers for intercalating sulfur is also described as a solution to prevent the "shuttle" mechanism. For example, document CN107452961 relates to a composite cathode material comprising elemental solid sulfur and carbon, wherein the sulfur molecules are intercalated between two layers of graphene. The distance between two graphene layers must range from 0.35 to 1 nm in order to obtain a high gravimetric capacity. The weight percentage of sulfur between the graphene layers preferably ranges from 30 to 40%

WO 2014/085992 discloses a Li—S cell in which the cathode is a sulfur-carbon composite material comprising a porous carbon substrate containing both micropores and mesopores and sulfur, wherein the sulfur is only contained in the micropores of the carbon substrate, and wherein the micropores have an average diameter of 0.4-2 nm, and the mesopores have an average diameter of 3-8 nm.

WO 2013/120263 discloses a sulfur-containing composite as a cathode material of a Li—S cell. Sulfur is loaded in the microporous channels formed by the micropores of a conductive microporous substrate. The conductive microporous substrate may be in the form of carbon nanotubes (CNTs) the external surface of which is coated by a microporous carbon (MPC) coating layer. The pores of the microporous carbon (MPC) coating layer contain sulfur. The conductive microporous substrate has a coaxial cable-like structure. The diameter of the carbon nanotubes ranges from 2-100 nm. The thickness of the microporous layer ranges from 30 to 150 nm. The conductive microporous substrate may also be in the form of microporous carbon spheres (MPCS) having a diameter of 200-800 nm.

WO 2013/078605 discloses a sulfur-containing composite as a cathode material of a Li—S cell. The sulfur-carbon composite comprises a pyrolysis microporous carbon sphere (PMCS) substrate and sulfur loaded into the pores of said pyrolysis microporous carbon sphere (PMCS) substrate. The pyrolysis microporous carbon sphere (PMCS) substrate has a BET specific surface area of 400-1000 $m^2/g$ and a diameter of 200-800 nm.

Still, novel Li—S electrochemical cells are sought, in which the "shuttle" mechanism is substantially reduced or suppressed, and which exhibit a high gravimetric capacity. Li—S electrochemical cells exhibiting a gravimetric capacity of more than 600 mAh/g of sulfur, preferably more than 800 mAh/g of sulfur, and even more preferably more than 1000 mAh/g of sulfur are sought.

SUMMARY OF THE INVENTION

To this end, the invention provides a novel Li—S electrochemical cell lithium/sulfur type comprising:
a) a cathode comprising:
   i) microporous carbon in the form of particles, the particle size distribution being characterized by a median volume diameter $Dv_{50}$ of the particles which is greater than or equal to 1 μm and less than or equal to 5 μm;

ii) sulfur having an oxidation degree in the range of 0 to −2 in the pores of the microporous carbon;

b) an electrolyte comprising a solvent, said solvent comprising at least one fluorinated carbonate;

c) an anode composed of lithium metal or of a lithium metal alloy.

The Applicant has unexpectedly discovered that the association of:

a) a microporous particulate carbon having a particle size distribution characterized by a median volume diameter $Dv_{50}$ of the particles greater than or equal to 1 µm and less than or equal to 5 µm; with b) a fluorinated carbonate allows a significant improvement of the gravimetric capacity of a lithium-sulfur cell. This association avoids the formation of polysulfides in the electrolyte during the charge-discharge process. As a result, the "shuttle" mechanism and the self-discharge caused by the presence of the polysulfides in the electrolyte are greatly reduced.

Further, it has been discovered that the use of at least one fluorinated carbonate in the electrolyte solvent improves cycle life in comparison with a cell in which the electrolyte solvent is based on a non-fluorinated compound.

The invention also allows minimizing the electrolyte amount, which helps to increase the energy density of the cell. The ratio of the electrolyte volume to the sulfur weight may be below 4 µL/mg of sulfur.

In one embodiment, the particle size distribution is characterized by a median volume diameter Dv50 of the particles which is greater or equal to 1 µm and less or equal to 2 µm.

In one embodiment, the particles of microporous carbon have a specific surface area of more than 1000 $m^2$/g.

In one embodiment, sulfur is elemental solid sulfur and:
the weight of elemental solid sulfur accounts for from 30 to 90%, or from 40 to 60% of the sum of the weight of the microporous carbon and the weight of elemental solid sulfur,
the weight of microporous carbon accounts for from 70 to 10%, or from 60 to 40% of the sum of the weight of the microporous carbon and the weight of elemental solid sulfur.

In one embodiment, the solvent further comprises a non-fluorinated carbonate and:
the fluorinated carbonate accounts for from 5 to 90% or from 10 to 50% or from 10 to 30% of the volume of the solvent,
the non-fluorinated carbonate accounts for from 95 to 10% or from 90 to 50% or from 90 to 70% of the volume of the solvent.

In one embodiment, the fluorinated carbonate is a cyclic carbonate and can be monofluoroethylene carbonate (F1EC).

In one embodiment, the non-fluorinated carbonate is a linear carbonate and can be dimethyl carbonate (DMC).

In one embodiment, the electrolyte contains at least one lithium salt selected from lithium hexafluorophosphate ($LiPF_6$), lithium bis(fluorosulfonyl)imide (LiFSI) or lithium bis(trifluoromethanesulfonyl)imide (LiTFSI) and mixtures thereof, preferably lithium bis(fluorosulfonyl)imide (LiFSI).

In one embodiment, the solvent is devoid of any ether or devoid of any ester.

DETAILED DESCRIPTION OF EMBODIMENTS

Figure 1:
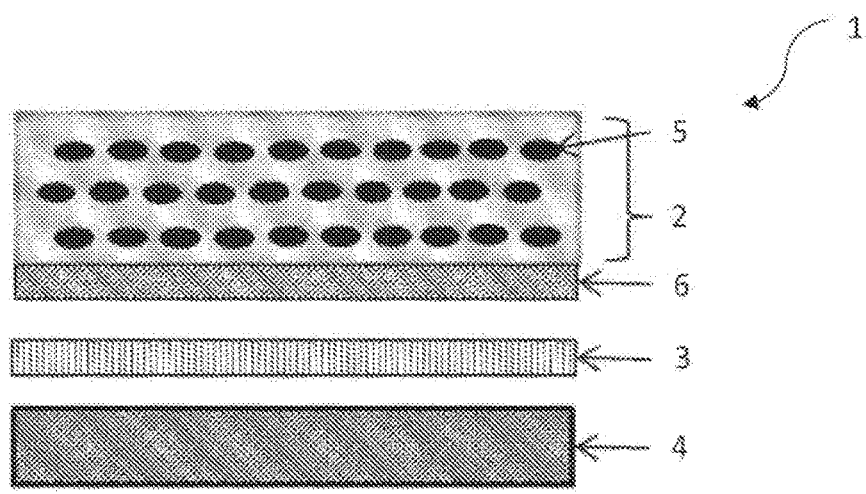
FIG. 1 is a schematic sectional view of an exploded stack of a cathode, a separator and an anode in the electrochemical Li—S cell according to the invention.

The various constituents of an electrochemical Li—S cell according to the invention is described in the following.

Cathode:

The cathode is a composite material prepared from electrochemically active elemental solid sulfur and non-electrochemically active compounds.

Elemental solid sulfur exists in different molecular forms. The preferred form is alpha sulfur Sα, of formula $S_8$ corresponding to cyclooctasulfur, which is the thermodynamically most stable form.

Carbon is one of the non-electrochemically active materials of the cathode. It has a porous structure which houses the particles of elemental solid sulfur. It exhibits specific features, namely:

a) it has a microporous structure, that is, the porous structure is predominantly composed of pores having an average diameter less or equal to 2 nm. Preferably, at least 50% or at least 75% or at least 90% of the porous volume is constituted by pores having an average diameter of less than or equal to 2 nm.

The pores of the porous structure may have an average diameter of from 0.5 nm to 2 nm. In one embodiment, at least 50% or at least 75% or at least 90% of the porous volume is constituted by pores having an average diameter of from 0.5 nm to 2 nm.

The microporous volume (in $cm^3$/g) of the microporous carbon may be measured according to the "t-plot" method from the nitrogen adsorption and desorption isotherms. The Horvath-Kawazoe method makes it possible to estimate the average pore diameter associated with the microporous volume from the nitrogen adsorption and desorption isotherms.

The mesopores, that is, the pores having an average diameter in the range of from 2 to 50 nm, may contribute to 40% or less, or to 30% or less, or to 20% or less or to 10% or less of the total pore volume. It is preferable that the contribution of the mesopores to the total porous volume be minimized in order to avoid the formation of polysulfides in the electrolyte. As mentioned above, polysulfides are not stable in the presence of carbonates and contribute to the undesired "shuttle" mechanism.

b) The microporous carbon is in the form of particles, the particle size distribution being characterized by a median volume diameter Dv50 of the particles which is greater than or equal to 1 µm and less than or equal to 5 µm. The term "median volume diameter Dv50 of X µm" means that 50% of the volume of the microporous carbon particles consists of particles having an equivalent diameter of less than X µm and 50% of the volume of the microporous carbon particles is composed of particles having an equivalent diameter greater than X µm. The term "equivalent diameter" of a particle designates the diameter of a sphere having the same volume as this particle. The particle size distribution of the microporous carbon particles may be determined through laser diffraction. A suitable apparatus for the determination of the particle size distribution is the Mastersizer 2000 commercialized by the Malvern Company. Other apparatuses based on the principle of laser diffraction may also be used. By drawing the particle size distribution of the microporous carbon, it is possible to determine the diameter value Dv50 which splits the particle size distribution into two equal halves. The particle size distribution of the carbon particles may be characterized by a median volume diameter Dv50 which is:
- greater than or equal to 1 μm and less than or equal to 4.5 μm, or
- greater than or equal to 1 μm and less than or equal to 2 μm, or
- greater than or equal to 1.5 μm and less than or equal to 4.5 μm, or
- greater than or equal to 1.5 μm and less than or equal to 2 μm.

The microporous carbon particles may have a specific surface area of more than 1000 m$^2$/g, or of 1500 m$^2$/g or more, or of 1800 m$^2$/g or more, or of 2000 m$^2$/g or more.

In one embodiment, the median volume diameter Dv50 is greater than or equal to 1.5 μm and the carbon specific surface area is more than 1500 m$^2$/g.

A possible method for incorporating elemental sulfur particles into the pores of the porous carbon structure is as follows: the microporous carbon is mixed with elemental solid sulfur. Typically, the weight of elemental solid sulfur accounts for from 30 to 90% or from 30 to 70% or from 40 to 60% or from 40 to 50% of the sum of the elemental solid sulfur weight and the carbon weight. The weight of microporous carbon typically accounts for from 70 to 10% or from 70 to 30% or from 60 to 40% or from 60 to 50% of the sum of the weight of the microporous carbon and the weight of elemental solid sulfur.

The mixture may be heated at a temperature of about 155° C. for about 5 hours under vacuum to allow the sulfur molecules to enter the open pores of the carbon. At around 155° C., the sulfur in the liquid state has its lowest viscosity. The mixture is then heated under an inert gas at a temperature of about 300° C. for about 30 minutes, which has the effect of subliming the sulfur and removing excess. The amount of elemental solid sulfur is measured on the composite through thermogravimetric analysis after treatment at 300° C. The product obtained is then generally mixed with at least one binder and at least one electronically conductive compound.

An electrically conductive compound is typically carbon black.

The binder may be chosen from carboxymethylcellulose (CMC), a butadiene-styrene copolymer (SBR), polytetrafluoroethylene (PTFE), polyamideimide (PAT), polyimide (PI), styrene-butadiene rubber (SBR), polyacrylic acid (PAA), polyvinyl alcohol, polyvinylidene fluoride (PVDF) and a mixture thereof.

One prepares an ink by mixing the microporous carbon containing sulfur in its porous structure, the one or more electrically conductive compounds and the one or more binders. The ink is applied on one or on both faces of a current collector. The current collector may be made of an aluminum strip. The current collector coated with the ink is rolled in order to adjust its thickness. A cathode is thus obtained.

A typical ink composition coated on the cathode current collector may be as follows:
- from 30 to 70% by weight, preferably from 40 to 60% of elemental solid sulfur relative to the sum of the weights of the elemental solid sulfur, the carbon, the binder(s) and the one or more electrically conductive compound(s);
- from 10 to 60% by weight, preferably from 40 to 50% of microporous carbon relative to the sum of the weights of the elemental solid sulfur, the carbon, the binder(s) and the one or more electrically conductive compound(s);
- from 3 to 8% by weight, preferably from 5 to 7% of the binder relative to the sum of the weights of the elemental solid sulfur, the carbon, the binder(s) and the one or more electrically conductive compound(s);
- from 2 to 7% by weight, preferably from 3 to 5% of the one or more electrically conductive compound(s) relative to the sum of the weights of the elemental solid sulfur, the carbon, the binder(s) and the one or more electrically conductive compound(s).

Anode:

The anode active material is a strip made of lithium metal or made of a lithium alloy.

Electrolyte:

The electrolyte is liquid and comprises an organic solvent. The organic solvent comprises one or several fluorinated carbonate(s). The fluorinated carbonate(s) may be one or more cyclic carbonate(s). The cyclic carbonate(s) may be selected from the non-exhaustive list comprising monofluoroethylene carbonate (FEC), also referred to as 4-fluoro-1,3-dioxolan-2-one, difluoroethylene carbonate, trifluoromethyl ethylene carbonate, also referred to as 4-trifluoro-1,3-dioxolan-2-one, monofluoropropylene carbonate, difluoropropylene carbonate, trifluoropropylene carbonate, and mixtures thereof. Preferably, the cyclic monofluorinated carbonate is monofluoroethylene carbonate (FEC).

It has been unexpectedly discovered that the fluorinated carbonate reduces at the cathode at the end of the discharge of the cell, especially during the first cycle. The reduction reaction leads to the formation of a passivation layer at the surface of the cathode. The presence of this passivation layer allows further improving the beneficial effect on the cell life cycle provided by the presence of the other passivation layer present at the surface of the lithium anode.

The solvent may comprise one or several non-fluorinated carbonate(s) in addition to the one or several fluorinated carbonate(s). In a mixture of the fluorinated carbonate(s) and the non-fluorinated carbonate(s), the fluorinated carbonate(s) may account to from 5 to 90%, or from 10 to 50% or from 10 to 30% of the volume of the solvent, and the non-fluorinated carbonate(s) may account to from 95 to 10% or from 90 to 50% or from 80 to 70% of the volume of the solvent.

The non-fluorinated carbonate may be a linear carbonate, such as dimethyl carbonate (DMC), diethyl carbonate (DEC), methyl ethyl carbonate (EMC) and methyl propyl carbonate (PMC). A preferred linear carbonate is dimethyl carbonate (DMC).

A preferred solvent consists in a mixture of monofluoroethylene carbonate (FEC) and dimethyl carbonate (DMC).

In one embodiment, the solvent is devoid of 1,3-dioxolane or devoid of tetrahydrofuran or devoid of 1,2-dimethoxyethane. In one embodiment, the solvent is devoid of any ether and/or devoid of any ester.

The electrolyte contains one or several lithium salt(s) which may be selected from lithium hexafluorophosphate LiPF$_6$, lithium perchlorate LiClO$_4$, lithium bis(fluorosulfonyl)imide LiN(SO$_2$F)$_2$ (LiFSI), lithium hexafluoroantimonate LiSbF$_6$, lithium tetrafluoroborate LiBF$_4$, lithium hexafluoroarsenate LiAsF$_6$, lithium trifluoromethanesulfonate LiCF$_3$SO$_3$, lithium bis(trifluoromethanesulfonyl)imide LiN(CF$_3$SO$_2$)$_2$ (LiTFSI), lithium trifluoromethanesulfonemethide LiC(CF$_3$SO$_2$)$_3$ (LiTFSM), lithium bisperfluoroethylsulfonimide LiN(C$_2$F$_5$SO$_2$)$_2$ (LiBETI), lithium 4,5-dicyano-2-(trifluoromethyl) imidazolide (LiTDI), lithium bis(oxalatoborate) (LiBOB), lithium tris(pentafluoroethyl)trifluorophosphate $LiPF_3(CF_2CF_3)_3$ (LiFAP). A preferred lithium salt is lithium bis(fluorosulfonyl) imide $LiN(SO_2F)_2$ (LiFSI).

The salt(s) may be dissolved in the solvent at a concentration ranging from 0.1 to 3 mol.L$^{-1}$, or at a concentration ranging from 0.5 to 1.5 mol.L$^{-1}$ or at a concentration around 1 mol.L$^{-1}$.

Separator:

A separator prevents electrical contact between an anode and a cathode but nevertheless allows the transport of ions between the anode and the cathode. The material of the separator may be chosen from: a polyolefin, for example polypropylene and polyethylene, a polyester, glass fibers bonded together by a polymer, polyimide, polyamide, polyaramid, polyamideimide and cellulose. The polyester may be selected from polyethylene terephthalate (PET) and polybutylene terephthalate (PBT). Advantageously, the polyester or polypropylene or polyethylene contains or is coated with a material selected from the group consisting of a metal oxide, a carbide, a nitride, a boride, a silicide and a sulfide. This material can be $SiO_2$ or $Al_2O_3$. The separator can comprise three distinct layers consisting of polypropylene/polyethylene/polypropylene.

FIG. 1 is a schematic sectional view of an exploded stack of a cathode (2), a separator (3) and an anode (4) of a Li—S electrochemical cell (1) according to the invention. The cathode has a porous structure (5). The pores of the cathode house sulfur. A stable passivation layer (SEI for "Solid Electrolyte Interface") (6) is formed on the surface of the cathode (2). It results from the reduction at the cathode of chemical species contained in the electrolyte during the discharge of the cell.

Preparation of the Electrode Assembly:

One obtains an electrode assembly by intercalating a separator between at least one cathode and at least one anode. One introduces the electrode assembly in the container. The container may be of prismatic (parallelepipedic) shape or of cylindric shape. In the latter case, the electrode assembly is spirally wound to form a "jelly-roll" electrode assembly.

Filling the Container with the Electrolyte:

The container provided with the electrode assembly is filled with the electrolyte as described above.

The Li—S cell according to the invention exhibits a gravimetric capacity of more than 600 mAh/g of sulfur, preferably more than 800 mAh/g of sulfur, even more preferably more than 1000 mAh/g of sulfur. A specific capacity of at least 1200 mAh/g of sulfur can even be contemplated. The Li—S cell according to the invention may address applications where improvements of the gravimetric capacity are required to go beyond that of lithium-ion cells. Lithium-sulfur cells according to the present invention may be used in space applications, such as satellites, and in the aviation industry.

EXAMPLES

A) The following examples illustrates the high gravimetric capacity of the cell according to the invention. Four cells A, B, C and D were prepared. These were 5 mAh coin cells. The cathode of these cells is a composite material which comprises:

i) 55% by weight of microporous particulate carbon, the particle size distribution being characterized by a median volume diameter Dv50 of the particles which equals to 9, 4.5, 1.8 and 1.1 μm for cells A, B, C and D respectively. In all the cells, the carbon particles have a mean pore diameter of 0.77 nm.

ii) 45 by weight of elemental solid sulfur.

The desired particle size distributions of the microporous particulate carbon were obtained by varying the time during which the microporous particulate carbon was ball milled.

Four sulfur-carbon composite materials A, B, C and D were obtained by mixing the microporous particulate carbon with elemental solid sulfur. The mixtures were heated at a temperature of 155° C. for about 5 hours under vacuum to allow the sulfur molecules to penetrate the pores of the carbon. Heating of the mixture was resumed at a temperature of 300° C. for 30 minutes under an inert gas stream to remove excess sulfur. The sulfur content in the carbon-sulfur composite prepared is measured by Thermogravimetric Analysis (TGA) using a TA Instrument Q500 instrument. The anode consisted of lithium metal in all cells. The electrolyte comprised as the solvent a mixture of 20 vol. % of monofluoroethylene carbonate (FEC) and 80 vol. % of dimethylcarbonate (DMC). LiFSI was dissolved in the solvent at a concentration of 1 mol.L$^{-1}$. The separator was a microporous membrane made of polyolefin, commercialized by the company Celgard under the trade name of Celgard® 2500.

Table 1 hereafter summarizes the various constituents of electrochemical cells A-D.

TABLE 1

|  | A* | B | C | D |
| --- | --- | --- | --- | --- |
| Cathode | Composite: 45 wt. % of sulfur 55 wt. % of microporous carbon: granulometry Dv50 = 9 μm mean pore diameter: 0.77 nm | Composite: 45 wt. % of sulfur 55 wt. % of microporous carbon: granulometry Dv50 = 4.5 μm mean pore diameter: 0.77 nm | Composite: 45 wt. % of sulfur 55 wt. % of microporous carbon: Granulometry Dv50 = 1.8 μm mean pore diameter: 0.77 nm | Composite: 45 wt. % of sulfur 55 wt. % of microporous carbon: granulometry Dv50 = 1.1 μm mean pore diameter: 0.77 nm |
| Electrolyte | 1 mol.L$^{-1}$ of LiFSI in FEC/DMC** (20 vol. %/80 vol. %) Low electrolyte ratio: Local 3 μL/mg of sulfur | | | |
| Separator | Celgard ® 2500 | | | |
| Anode | Lithium metal | | | |

*Comparative example
**FEC: monofluoroethylene carbonate
DMC: dimethyl carbonate The microporous carbon used in the examples is characterized by a BET surface specific area of more than 1500 m$^2$/g.

Cells A-D were charged and discharged at room temperature. The charge was performed at a rate of C/20. The discharge was performed at a rate of C/20.

Figure 2:
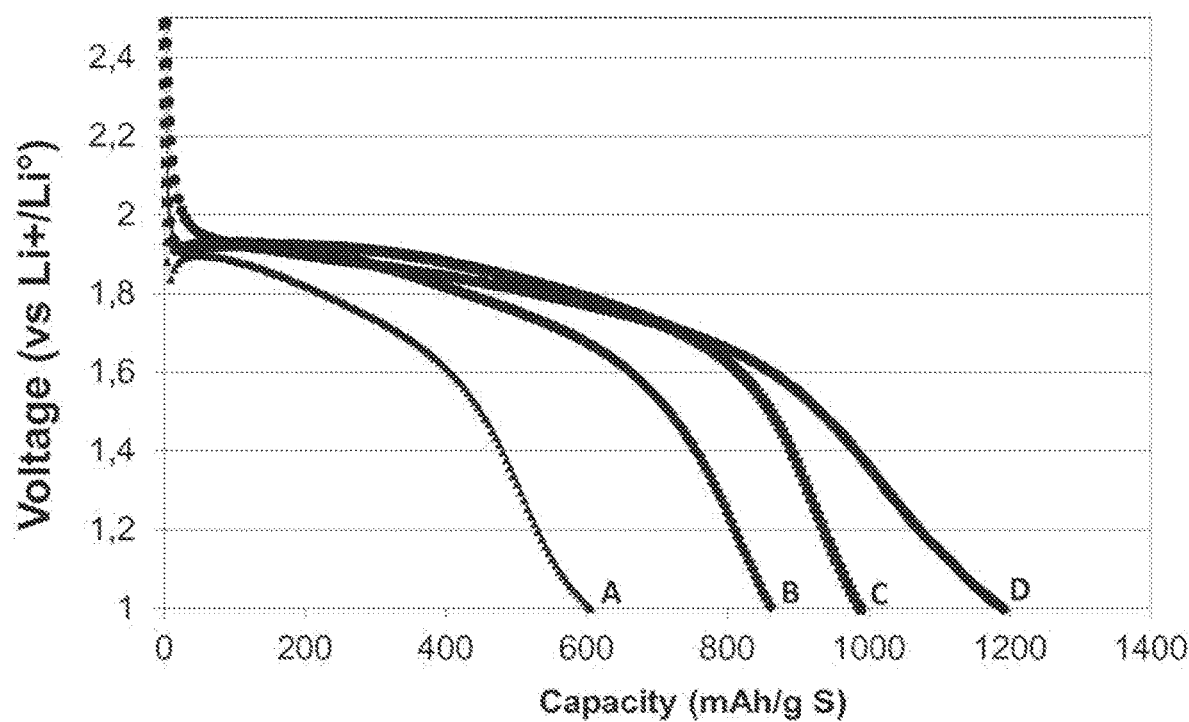
FIG. 2 shows variation of cell voltage during discharge for cells A-D.

The voltage of cells A-D during discharge was monitored. It is shown on FIG. 2 as a function of the cells discharged gravimetric capacity. One can note a significant improvement of the discharged gravimetric capacity due to a decrease of the microporous carbon granulometry from 9 to 1.1 microns. The decrease of the microcarbon particles size improves the sulfur redox mechanisms inside the microporous carbon. It is thought that the diffusion length for lithium is decreased. It is worth noting that the gravimetric capacity can reach values as high as 800 mAh/g of sulfur, even values as high as 1200 mAh/g of sulfur for cell D. Further, it is worth noting that the cells according to the invention use a low electrolyte amount, that is, the ratio between the electrolyte volume and the weight of sulfur is low. In examples A-D, it is 3.3 μL of electrolyte per mg of sulfur. This low electrolyte volume helps to increase the energy density of the Li—S cell.

Figure 3:
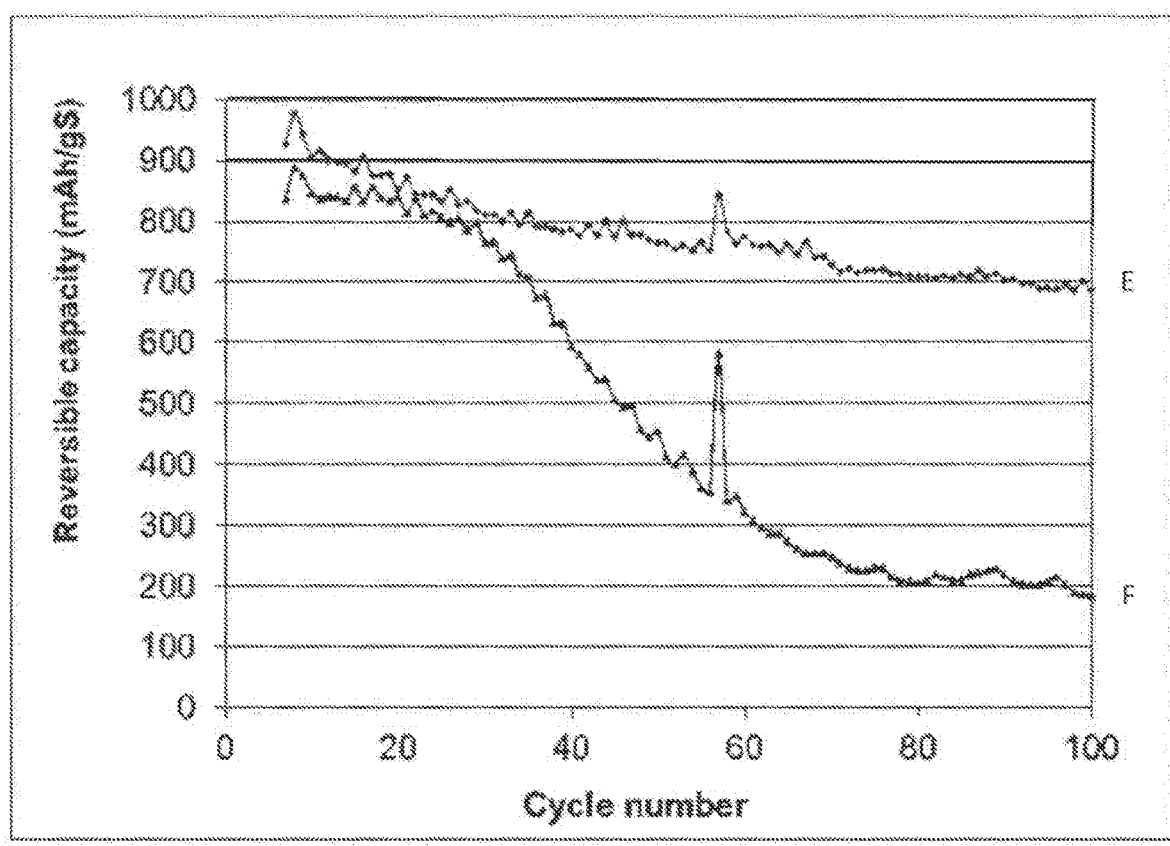
FIG. 3 shows variation of the retained capacity as a function of the number of cycles for cells E and F.

B) The effect of the replacement of a non-fluorinated carbonate by a fluorinated carbonate was assessed. Two Li—S cells E and F were prepared. The cathode of cells E and F was similar to the cathode of cell B. The solvent used in the electrolyte of cell E consisted of a mixture of 20 vol. % of monofluoroethylene carbonate (FEC) and 80 vol. % of dimethyl carbonate (DMC). The solvent used in the electrolyte of cell F consisted of a mixture of 20 vol. % of ethylene carbonate (EC) and 80 vol. % of dimethyl carbonate (DMC). In both cells E and F, the electrolyte salt was LiFSI dissolved at a concentration of 1 mol.L$^{-1}$. Cells E and F have undergone cycling. FIG. 3 shows the variation of the capacity of cells E and F as a function of the cycle number. It is worth noting that the capacity loss of cell E is much lower than that of cell F. Indeed, the capacity loss of cell E is about 25% after 100 cycles whereas the capacity loss of cell F is about 75% after the same number of cycles. This demonstrates the benefit of replacing a non-fluorinated carbonate (EC) by a fluorinated carbonate (FEC) on cycle life.

The invention claimed is:

1. An electrochemical cell of the lithium/sulfur type comprising:
    a) a cathode comprising:
        i) microporous carbon in the form of particles, the particle size distribution being characterized by a median volume diameter Dv$_{50}$ of the particles which is greater than or equal to 1 μm and less than or equal to 5 μm;
        ii) sulfur having an oxidation degree in the range of 0 to −2 in the pores of the microporous carbon;
    b) an electrolyte comprising a solvent, said solvent comprising at least one fluorinated carbonate;
    c) an anode composed of lithium metal or of a lithium metal alloy,
        wherein the particles of microporous carbon have a specific surface area of more than 1000 m$^2$/g,
        the fluorinated carbonate accounts for from 10 to 90% of the volume of the solvent, and
        the microporous carbon has a porous structure composed of pores having an average diameter ranging from 0.5 nm to less than 2 nm.

2. The electrochemical cell of claim 1, wherein the particle size distribution is characterized by a median volume diameter Dv$_{50}$ of the particles which is greater or equal to 1 μm and less or equal to 2 μm.

3. The electrochemical cell of claim 1, wherein sulfur is elemental solid sulfur and:
    the weight of elemental solid sulfur accounts for from 30 to 90% of the sum of the weight of the microporous carbon and the weight of elemental solid sulfur,
    the weight of microporous carbon accounts for from 70 to 10% of the sum of the weight of the microporous carbon and the weight of elemental solid sulfur.

4. The electrochemical cell of claim 3, wherein
    the weight of elemental solid sulfur accounts for from 40 to 60% of the sum of the weight of the microporous carbon and the weight of elemental solid sulfur,
    the weight of microporous carbon accounts for from 60 to 40% of the sum of the weight of the microporous carbon and the weight of elemental solid sulfur.

5. The electrochemical cell of claim 1, in which the solvent further comprises a non-fluorinated carbonate and:
    the fluorinated carbonate accounts for from 20 to 90% of the volume of the solvent,
    the non-fluorinated carbonate accounts for from 80 to 10% of the volume of the solvent.

6. The electrochemical cell of claim 5, in which:
    the fluorinated carbonate accounts for from 20 to 50% of the volume of the solvent,
    the non-fluorinated carbonate accounts for from 80 to 50% of the volume of the solvent.

7. The electrochemical cell of claim 6, in which:
    the fluorinated carbonate accounts for from 20 to 30% of the volume of the solvent,
    the non-fluorinated carbonate accounts for from 80 to 70% of the volume of the solvent.

8. The electrochemical cell according to claim 5, in which the non-fluorinated carbonate is a linear carbonate.

9. The electrochemical cell according to claim 8, in which the non-fluorinated linear carbonate is dimethyl carbonate (DMC).

10. The electrochemical cell according to claim 1, in which the fluorinated carbonate is a cyclic carbonate.

11. The electrochemical cell of claim 10, in which the fluorinated cyclic carbonate is monofluoroethylene carbonate (F1EC).

12. The electrochemical cell of claim 1, in which the electrolyte contains at least one lithium salt selected from the group consisting of lithium hexafluorophosphate (LiPF$_6$), lithium bis (fluorosulfonyl) imide (LiFSI), lithium bis (trifluoromethanesulfonyl) imide (LiTFSI), and mixtures thereof.

13. The electrochemical cell of claim 1, in which the solvent is devoid of any ether or devoid of any ester.

14. The electrochemical cell of claim 1, wherein the particle size distribution is characterized by a median volume diameter Dv$_{50}$ of the particles ranging from 1.5 μm to 4.5 μm.

15. The electrochemical cell of claim 1, wherein the particle size distribution is characterized by a median volume diameter Dv$_{50}$ of the particles ranging from 2 μm to 4.5 μm.

* * * * *